June 13, 1950 P. J. KIRCHER 2,511,471
ADJUSTMENT FOR THERMOSTATIC SWITCHES
Filed March 6, 1947 2 Sheets-Sheet 1
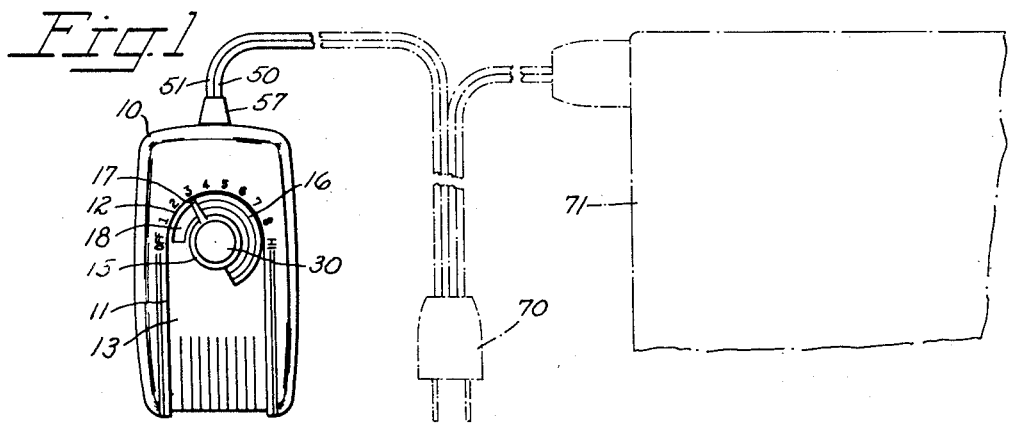
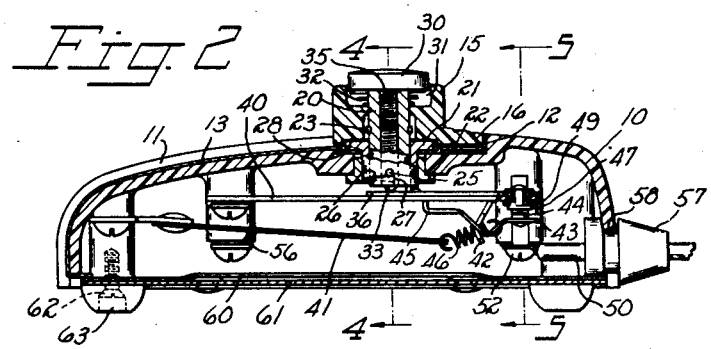
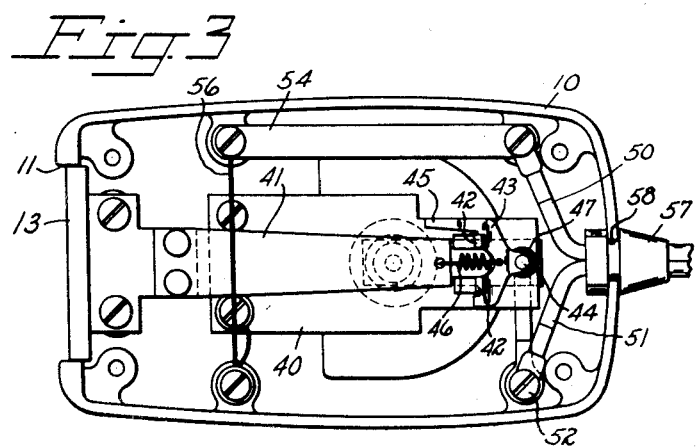
Inventor
PAUL J. KIRCHER
By T. Clay Lindsey
Attorney

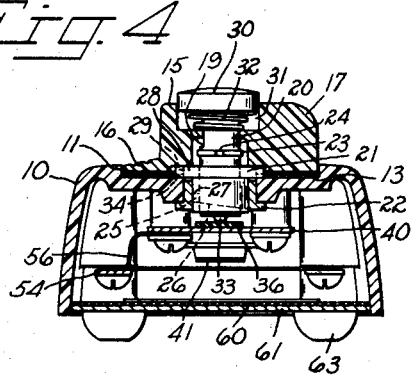
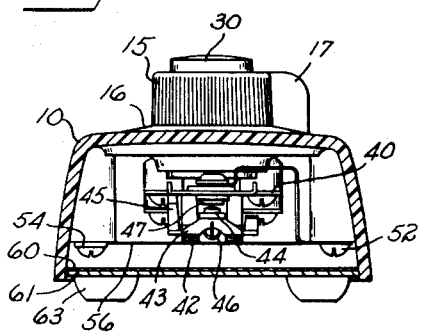
Inventor
PAUL J. KIRCHER

Patented June 13, 1950

2,511,471

UNITED STATES PATENT OFFICE 2,511,471

ADJUSTMENT FOR THERMOSTATIC SWITCHES

Paul J. Kircher, Plainville, Conn., assignor to Landers, Frary & Clark, New Britain, Conn., a corporation of Connecticut Application March 6, 1947, Serial No. 732,744

7 Claims. (Cl. 200—138)

The present invention relates generally to electrical control devices, and more particularly to a manually settable switch mechanism adapted to be used for controlling the heating action of an associated device such as, for example, an electric blanket. The device of the present invention is of a type having a thermostatically operated switch arrangement by means of which an electrical circuit may be opened and closed intermittently at intervals depending upon the temperatures ambient to the thermostat elements and the setting thereof.

It is an object of the present invention to provide a control device of the character described which is provided with an adjustable thermostatic switch unit which may be manually set to control the heat output of an associated device and which also will function for initiating the operation of the associated device or for rendering it inoperative.

A further object of the invention is to provide a control device of this type which has a single manually operable control element which is utilized to turn off and on the associated device and for setting the thermostatic elements of the device to provide the desired control of the heat output of an associated device.

In connection with the foregoing object, it is an aim of the present invention to provide a device which is of simple construction and which eliminates unnecessary parts. It is a particular aim of the present invention to permit the use of the thermostat elements for both regulating the operation of the associated device and also for turning the device on and off. In accordance with the present invention, there is no requirement for a separate switch element or master switch for turning on and off the apparatus.

Another object of the invention is to provide a control device which is characterized by the ease and facility with which it may be set and yet at the same time to provide a device which is substantially fool-proof in operation so that it is unlikely that the switch will be turned on and off inadvertently or by irresponsible persons, such as children.

Another object of the invention is to provide a control device of the character described which presents a visual indication of the setting of the device and which, when turned to the off position, renders the switch elements inoperative for closing the circuit with a distinct audible click which assures the operator that the device has been turned to the completely off position.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Figure 1 is a plan view of the device shown with connections to an electric blanket and a plug for use with an ordinary household current outlet;

Fig. 2 is a central, vertical section longitudinally of the device shown in Fig. 1;

Fig. 3 is a bottom view of the device with the bottom plate removed;

Fig. 4 is a cross sectional view taken on the line 4—4 of Fig. 2; and

Fig. 5 is a cross sectional view taken on the line 5—5 of Fig. 2.

Referring to the drawings in detail, a device constructed in accordance with the present invention for use with electric blankets is shown housed in a casing 10 which, in the specific embodiment shown, is formed of a suitable plastic material and which is inclined slightly upwardly toward the rear to give the casing a pleasing, stream-lined appearance. Centrally and longitudinally of the device and extending around the front thereof is a depressed area 11 which at its rear portion 12 is semi-circular in outline. Received within this area is a decorative, metallic face plate 13 of similar contour and shaped to fit within the depressed area 11.

As will be described more fully later, the device is adapted to be operated by a knurled knob 15 formed with a semi-circular shield portion or flange 16 and a radial projection 17 adapted to function as a combination pointer and thumb piece at one edge of the shield portion 16. The knob 15 seats within the depressed area 11 with the semi-circular shield portion 16 turnable within the semi-circular rear portion 12 and extends upwardly above the upper surface of the casing 10 so that it may be readily grasped and turned by the operator. As the knob 15 is turned clockwise, as viewed in Fig. 1, the setting of the knob may be read by reference to suitable indicia on the casing about the semi-circular, depressed portion 12, particularly that which is aligned with the radial projection 17 on the knob 15 and also by the amount of contrasting band 18 on the face plate 13 which is revealed upon the turning of the shield portion 16.

The knob 15 is centrally apertured and is slidably mounted on a hollow spindle 20 which is journaled in the casing 10 through telescoped bushings 21 and 22. The inner bushing 21 has an upper flange 28 overlying the upper surface of the casing 10 and the metallic face plate 13 which are slightly indented to receive the flange, and the flange is slotted at 29 to engage ears 34 on the face plate 13. The outer bushing 22 has a lower flange which rests against the underside of the casing 10. The bushings 21 and 22 are press-fitted together to form a rigid connection with the casing 10 and to provide the journal for the spindle 20.

The spindle 20 is freely rotatable and is longitudinally slidable within the journal formed by bushings 21 and 22, but the downward longitudinal movement thereof is limited by means of a snap ring 23 received in the groove 24 in the spindle 20 and the upward longitudinal movement by means of a pin 25 extending outwardly from the spindle adjacent its lower end where it is adapted to engage the underside of the bushing 21.

The knob 15 has a circular indentation on its lower surface by means of which it is seated on the flange 28 of the bushing 21 while the flange is of sufficient thickness to position the knob 15 slightly spaced above the surface of the face plate 13 so that the knob 15 is freely turnable with a minimum of friction. The spindle 20 and the central aperture in the knob 15 are provided with interengaging flat sides at 19 to prevent relative turning of the knob with respect to the spindle and for permitting the spindle to be turned by rotation of the knob.

The spindle 20 is adapted to be depressed longitudinally inwardly of the device by means of a button 30 which is secured to the spindle 20 by a threaded shank 35 which may be screwed into the upper end of the spindle 20 with the button received within an enlarged opening 31 in the upper face of the knob 15. The button 30 and the spindle 20 are urged outwardly relative to the knob 15 by a spiral spring 32 compressed between the knob 15 and the button 30 interiorly of the opening 31. As will be apparent, when the button 30 is pressed downwardly as by the user's forefinger, the knob 15 remains seated against the upper flange on the bushing 21 while the spindle 20 is moved inwardly of the casing, the extent of such movement being limited by the snap ring 23 previously referred to. When the button 30 is released, the spring 32 urges the button 30, and hence the spindle 20, upwardly, the extent of this movement being limited by engagement of the pin 25 against the underside of the bushing 21.

The lower edge of the bushing 21 is formed with a semi-circular, cut-away portion 26 forming an inclined camming surface upon which the pin 25 may rest and with a relatively deep, radial notch 27 at the highest point of the semi-circular, cut-away portion 26. As will be apparent, when the spindle 20 is turned by means of the knob 15 so as to align the pin 25 with the notch 27, the spindle 20 and button 30 are permitted to slide upwardly to the fullest extent under the influence of spring 32. When the spindle 20 is pushed inwardly as by pressure on the button 30, the pin 25 clears the notch 27, whereupon the spindle may be turned with the pin 25 riding upon the camming surface 26, which gradually increases the amount to which the spindle extends inwardly of the casing 10. Rotation of the spindle 20 is limited by engagement of the pin 25 with the edge of the uncut portion of the bushing 21. The snap ring 23 is so positioned that it will not permit the spindle 20 to be moved inwardly a sufficient amount so that the pin 25 will clear the uncut end portion of the bushing 21.

The longitudinal position of the spindle 20 is utilized to set the device as explained hereafter. On the underside of the casing 10 there is mounted a resilient support arm 40 which is anchored at one end and extends underneath the spindle 20. The portion of the support arm 40 which extends underneath the spindle 20 is provided with an insulating pad 36 which bears against a set screw 33 which is threadably received within the lower end of the spindle 20. The set screw 33 is adjustable so that the arm 40 may be properly positioned by the spindle 20. As will be apparent, movement of the spindle inwardly of the casing 10 causes the support arm 40 to be flexed downwardly and, when the spindle 20 is turned to align the pin 25 with the notch 27, the support arm 40 is permitted to snap upwardly to the normal position shown in Fig. 2, this being accompanied by a distinct audible click as the released elements snap to the uppermost position. The degree to which the arm 40 is flexed downwardly determines the operating characteristics of the control device and this flexing in turn is determined by the extent to which the spindle 20 is moved downwardly by the camming action of the lower edge 26 of the bushing 21 acting against the pin 25, which position is indicated by the setting of the control knob 15 previously referred to.

Mounted on the end of the support arm 40 is a contact point 47 which is positioned in an insulating bushing 49 mounted on the insulating pad 36 so that it forms no electrical connection with the arm 40. The contact point 47 is connected to a terminal 52 provided on the interior of the casing 10. Also mounted on the arm 40 by means of a pair of brackets 42 is a pivotal switch arm 43 carrying a contact point 44. When the switch arm 43 is pivoted about its pivot on the brackets 42 in a counterclockwise direction as viewed in Fig. 2, the contact point 44 thereon meets the contact point 47 establishing an electrical connection therebetween. Clockwise pivoting of the switch arm 43 is limited by an extension 45 which engages the underside of the arm 40 after the contact point 44 has been spaced a sufficient distance from contact point 47 to open the circuit. By reason of the metallic brackets 42 and metallic switch arm 43, the contact point 44 is electrically connected to the support arm 40 which, in turn, is connected to one end of a heater wire 56 which is connected at the other end to a terminal 54.

Also anchored at one end of the casing 10 and generally parallel to the resilient support arm 40 is a bi-metallic arm 41, the free end of which is adapted to move downwardly away from the support arm 40 when the arm 41 is heated and upwardly toward the support arm 40 when the arm 41 is permitted to cool. The end of the bi-metallic arm 41 is connected to the switch arm 43 by means of a coil spring 46. As a result of this interconnection, the pivoted position of the switch arm 43 is determined by the spacing between the free end of the bi-metallic arm 41 and the support arm 40. When this spacing is reduced enough so that the spring 46 extends in a line above the pivot of the switch arm 43, the arm pivots in a counterclockwise direction, as viewed in Fig. 2, with a snap action closing the circuit through contact points 44 and 47. When the spacing between the free end of the bi-metallic arm 41 and the support arm 40 is increased to the extent that the spring 46 acts in a line below the pivot of switch arm 43, the switch arm 43 moves to the off position shown in Fig. 2 again with a snap action.

For purposes of illustration, the terminals 52 and 54 are shown connected to a pair of lead-in wires 50 and 51 which extend through an insulating bushing 57 slidably received in the notch 58 in the casing 10, which wires 50 and 51 may be connected to a conventional electrical plug 70 and an electric blanket 71 as shown in dot and dash lines in Fig. 1.

The bottom of the casing is enclosed by an insulating sheet 60 and metallic plate 61 which are secured to the casing 10 by means of screws 62 which are received through rubber buttons 63 forming supporting legs for the casing whereby it may rest on a polished surface without scratching or otherwise marring the same.

The operation of the device of the present invention will be readily understood from the above description taken in connection with the following explanation. Assuming that the knob 15 is turned to the off position so that the pin 25 is received within the relatively deep notch 27 thereby permitting the support arm 40 to move to its uppermost position as shown in Fig. 2, the separation between the support plate 40 and the free end of the bi-metallic arm 41 is so great that no expected amount of cooling of the bi-metallic arm 41 would be sufficient to cause the spring 46 to act in a line above the pivot of the switch arm 43 to close the circuit through contact points 44 and 47. As the knob 15 is prevented from turning while the pin 25 is in the notch 27, it is highly unlikely that the device will be accidentally turned to an on position and the device is relatively safe from improper handling as, for example, by children.

When it is desired to operate the associated device, such as the electric blanket illustrated, it is necessary to press the button 30 inwardly and to hold it in depressed position to cause the pin 25 to clear the notch 27 while the knob 15 is turned to cause the pin 25 to ride on the cam surface 26. The extent to which the knob 15 is turned determines the extent to which the spindle 20 is moved longitudinally inwardly through engagement of the pin 25 and cam surface 26, as previously described, which, in turn, determines the position of the support arm 40. This setting is visually indicated on the exterior of the casing by the indicia thereon and by the amount of contrasting band 18 which is exposed by the shield portion 16 of the knob 15. When the support arm 40 is moved downwardly a sufficient amount so that the spring 46 acts in a line above the pivot of the switch arm 43, the circuit through contact points 44 and 47 is closed with a snap action and the associated device, such as the electric blanket illustrated, is permitted to function. During operation of the associated device, however, current is caused to pass through the heater wire 56 causing heat to be generated in the vicinity of the bi-metallic arm 41 which eventually becomes sufficient to move the free end of the arm downwardly a sufficient distance to cause the spring 46 to act below the pivot of switch arm 43 thus causing the circuit to open. The circuit will remain open until the bi-metallic arm 41 has cooled down sufficiently to cause the spring 46 to again act above the pivot of the switch arm 43, whereupon the action previously described is repeated. As will be apparent, the duration of the off periods will be directly responsive to ambient temperature, i. e. the speed with which the bi-metallic arm 41 is cooled, and, of course, in response to the setting of the support arm 40 by the knob 15.

When it is desired to turn off the associated apparatus, it is necessary only to return the knob 15 to the off position whereupon the pin 25 enters the notch 27 permitting the spindle 20 and support arm 40 to move upwardly with a distinct audible click thus moving the thermostat switch elements to a position where closing of the circuit through contact points 44 and 47 cannot take place under reasonably expected temperature conditions.

It thus will be seen that there has been provided, in accordance with the invention, an electrical control device suitable as a heat control which is of simple construction and may be made from readily available and easily manufactured parts, which device is extremely effective for both turning on and off the associated apparatus and for regulating the heat output thereof, this use of the device being controlled by a single control member which visually indicates the setting of the device and which is effective for releasably locking the device against inadvertent misuse.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a heat control device having a settable switch element, the combination therewith of means for setting the element comprising a casing, a spindle extending through said casing arranged to be manually rotated and moved longitudinally with respect to the casing, and means for positioning the spindle in a selected rotated and longitudinal position with respect to the casing comprising a cam follower on the spindle and a cam surface on the casing engaged by said follower, said cam surface being constructed and arranged to limit turning of the spindle between a first and second rotated position and to move the spindle increasingly inwardly of the casing as the spindle is turned in one direction between said rotated positions, said surface being provided with a notch at said first rotated position to permit abrupt outward movement of the spindle at said position and to prevent turning of the spindle from said position unless the spindle is manually moved inwardly of the casing.

2. In a heat control device having a settable switch element, the combination therewith of means for setting the element comprising a casing, a spindle journaled in said casing and arranged to be manually rotated and moved longitudinally with respect to the casing, means for positioning the spindle in a selected rotated and longitudinal position with respect to the casing comprising a pin extending radially outwardly from the spindle and an arcuate cam surface engaged by said pin to retain the spindle longitudinally inwardly of the casing at varying distances depending on the rotated position of the spindle, and a shoulder at each end of the arcuate cam surface engageable by said pin to limit rotational movement of the spindle, said cam surface being formed with a notch adjacent one of said shoulders to permit abrupt outward longitudinal movement of the spindle when the pin is aligned therewith.

3. In a heat control device having a settable switch element, the combination therewith of means for setting the element comprising a casing, a spindle journaled in said casing for rotational and longitudinal movement with respect to the casing, a centrally apertured knob exterior to the casing and non-rotatably mounted on the spindle for turning same, the spindle being axially movable with respect to the knob, a push button on the end of the spindle to permit depression of the spindle relative to the knob, spring means normally moving the button and spindle upwardly with respect to the knob, means for controlling upward longitudinal movement of the spindle comprising a pin extending radially outwardly from the spindle and an inclined arcuate cam surface on the casing engaged by the pin, and a shoulder at each end of the arcuate cam surface engageable by said pin to limit rotational movement of the spindle, said cam surface being formed with a notch adjacent one of said shoulders to permit abrupt upward longitudinal movement of the spindle when the pin is aligned therewith.

4. In a heat control device having a settable switch element, the combination therewith of means for setting the element comprising a casing, a spindle journaled in said casing for rotational and longitudinal movement with respect to the casing, a centrally apertured knob formed with a semi-circular shield portion exterior to the casing and non-rotatably mounted on the spindle for turning same, the spindle being axially movable with respect to the knob, a push button on the end of the spindle to permit depression of the spindle relative to the knob, spring means normally moving the button and spindle upwardly with respect to the knob, means for controlling upward longitudinal movement of the spindle comprising a pin extending radially outwardly from the spindle and an inclined arcuate cam surface on the casing engaged by the pin, and a shoulder at each end of the arcuate cam surface engageable by said pin to limit rotational movement of the spindle, said cam surface being formed with a notch adjacent one of said shoulders to permit abrupt upward longitudinal movement of the spindle when the pin is aligned therewith, said casing being provided with a contrasting arcuate band arranged to be exposed by turning of the shield portion of the knob and indicia adjacent thereto for visually indicating the setting of the spindle.

5. In a heat control device having a casing and a snap switch switch therein for opening and closing an electrical circuit which is operated by the relative spacing of the free ends of a resilient support arm and a bi-metallic arm secured at one end to the casing, the combination therewith of means for positioning the resilient support arm comprising a spindle extending through said casing arranged to be manually rotated and moved longitudinally with respect to the casing and the end of the spindle within the casing engaging said resilient support arm, and means for positioning the spindle in a selected rotated and longitudinal position with respect to the casing comprising a cam follower on the spindle and a cam surface on the casing engaged by said follower, said cam surface being constructed and arranged to limit turning of the spindle between a first and second rotated position and to move the spindle increasingly inwardly of the casing as the spindle is turned in one direction between said rotated positions, said surface being provided with a notch at said first rotated position to permit abrupt outward movement of the spindle at said position and to prevent turning of the spindle from said position unless the spindle is manually moved inwardly of the casing.

6. In a heat control device having a casing and a snap switch therein for opening and closing an electrical circuit which is operated by the relative spacing of the free ends of a resilient support arm and a bi-metallic arm secured at one end to the casing, the combination therewith of means for positioning the resilient support arm comprising a spindle extending through said casing arranged to be manually rotated and moved longitudinally with respect to the casing, means for positioning the spindle in a selected rotated and longitudinal position with respect to the casing comprising a cam follower on the spindle and a cam surface on the casing engaged by said follower, said cam surface being constructed and arranged to limit turning of the spindle between a first and second rotated position and to move the spindle increasingly inwardly of the casing as the spindle is turned between said rotated positions, said surface being provided with a notch at said first rotated position to permit abrupt outward movement of the spindle at said position and to prevent turning of the spindle from said position unless the spindle is manually moved inwardly of the casing, and an axially adjustable bearing surface on the end of the spindle for engaging the support arm.

7. In a heat control device having a casing and a snap switch therein for opening and closing an electrical circuit which is operated by the relative spacing of the free ends of a resilient support arm and a bi-metallic arm secured at one end to the casing, the combination therewith of means for positioning the resilient support arm comprising a spindle journaled in said casing for rotational and longitudinal movement with respect to the casing, a centrally apertured knob exterior to the casing and non-rotatably mounted on the spindle for turning same, the spindle being axially movable with respect to the knob and one end thereof extending into the casing and engaging said resilient support, a push button on the end of the spindle to permit depression of the spindle relative to the knob, spring means normally moving the button and spindle upwardly with respect to the knob, means for controlling upward longitudinal movement of the spindle comprising a pin extending radially outwardly from the spindle and an inclined arcuate cam surface on the casing engaged by the pin, and a shoulder at each end of the arcuate cam surface engageable by said pin to limit rotational movement of the spindle, said cam surface being formed with a notch adjacent one of said shoulders to permit abrupt upward longitudinal movement of the spindle when the pin is aligned therewith.

PAUL J. KIRCHER.

REFERENCES CITED

The following references are of record in the file of this patent:

UNITED STATES PATENTS

| Number | Name | Date |
|---|---|---|
| 1,703,701 | Zelnio et al. | Feb. 26, 1929 |
| 1,916,671 | Hanser et al. | July 4, 1933 |
| 1,985,100 | Kuhn et al. | Dec. 18, 1934 |
| 2,079,282 | Du Bois | May 4, 1937 |
| 2,191,670 | Kuhn et al. | Feb. 27, 1940 |